United States Patent [19]

Botnick

[11] 4,286,616

[45] * Sep. 1, 1981

[54] NON-FREEZE WALL HYDRANT

[76] Inventor: Irlin H. Botnick, 3155 Kersdale Rd., Pepper Pike, Ohio 44124

[*] Notice: The portion of the term of this patent subsequent to Apr. 27, 1993, has been disclaimed.

[21] Appl. No.: 140,723

[22] Filed: Apr. 16, 1980

Related U.S. Application Data

[60] Division of Ser. No. 654,866, Feb. 3, 1976, Pat. No. 4,221,233, said Ser. No. 654,866, is a continuation-in-part of Ser. No. 425,503, Dec. 17, 1973, Pat. No. 3,952,770.

[51] Int. Cl.³ ............................................. F16K 31/50
[52] U.S. Cl. .................................. 137/327; 137/215; 137/218; 137/360; 137/614.2
[58] Field of Search ............... 137/215, 218, 327, 360, 137/614.2

[56] References Cited

U.S. PATENT DOCUMENTS

| 536,801 | 4/1895 | Gaghan | 137/360 |
|---|---|---|---|
| 723,832 | 3/1903 | Cook | 137/360 |
| 3,106,935 | 10/1963 | Gatzke | 137/360 X |
| 3,267,952 | 8/1966 | Pletcher et al. | 137/360 X |
| 3,424,189 | 1/1969 | Woodford | 137/218 |
| 3,952,770 | 4/1976 | Botnick | 137/218 X |

FOREIGN PATENT DOCUMENTS

| 940462 | 10/1963 | United Kingdom | 137/360 |

*Primary Examiner*—Gerald A. Michalsky
*Attorney, Agent, or Firm*—Isler and Ornstein

[57] ABSTRACT

In a wall hydrant, on the inner and outer ends of a wall-penetrating conduit, an inlet connection casting and a discharge casting; a valving member movable axially in an inlet valving bore relative to a seat; a lateral conduit outlet from a discharge casting bore; a shaft structure including key-rotated stem threaded through a plug in the latter bore end and connected axially to shift, upon rotation, the valving member, and also a shaft-carried flange "O"-ring sealable on an interior surface controlling plug-associated exterior draining and air vent openings; the valving and flange seals being spaced, relative to the controlling surface and inlet bore spacing, for conduit drainage and vent opening after inlet closure; a part of the shaft structure upon removal being invertable to serve as a valve seat service tool. Within the hydrant, an anti water backup device. A hydrant wall box, and a vacuum breaker including a discharge casting outlet enlargement with a cap having a hose connection and with the enlargement defining air vents; a hollow flexible elastomeric element with an open-ended inner end portion fitted into the mating enlargement end and having an outer end seal portion to outwardly seal the vents, and a headed member within the flexible element shiftable with water flow outwardly against the seal portion to increase vent sealing pressure and biased inwardly; the head being plurally through-apertured radially inward of vent-closing seal contact; the seal portion being flexible inwardly to open the vents, and further to seal upon the head, whereby back flow is prevented and the air vents opened for hose drainage and/or vacuum breaking.

10 Claims, 13 Drawing Figures

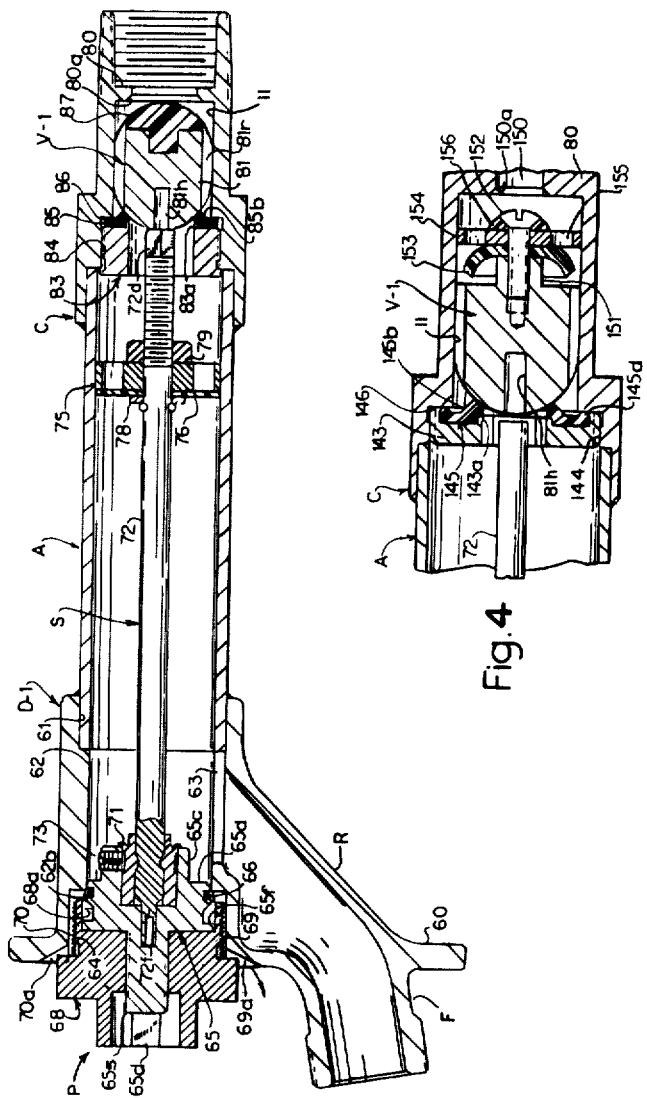

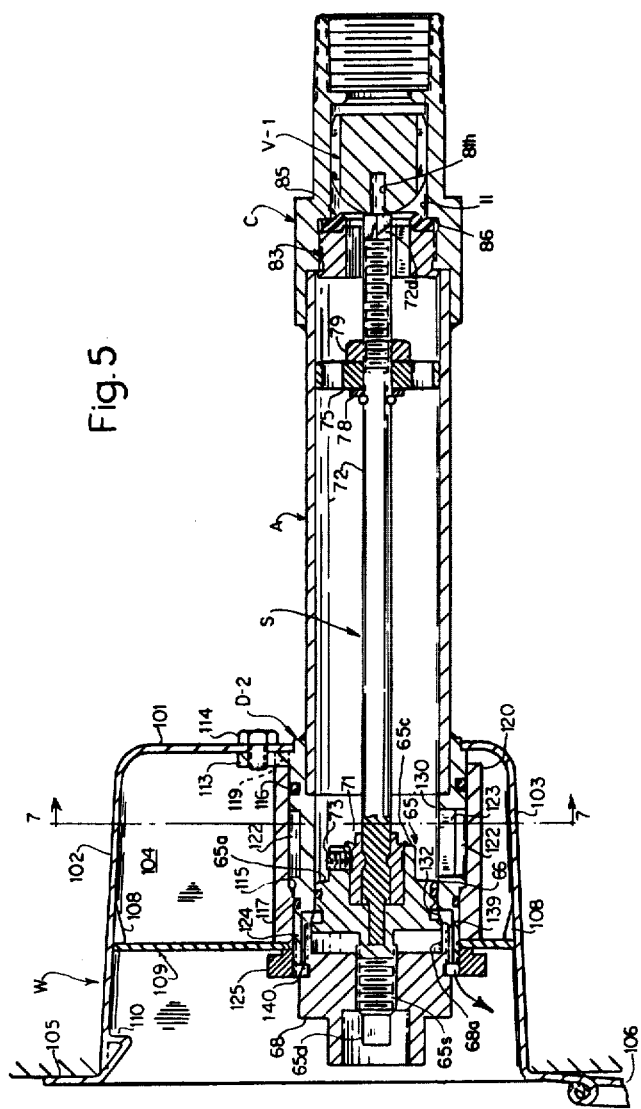

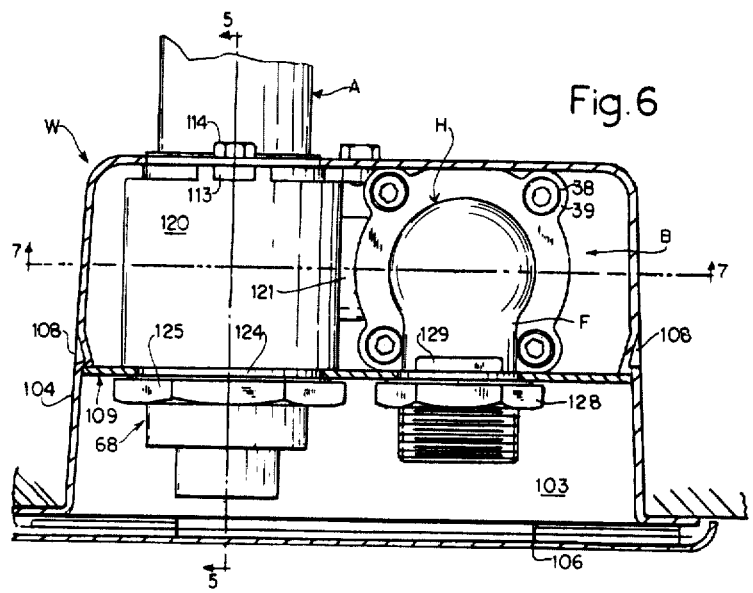
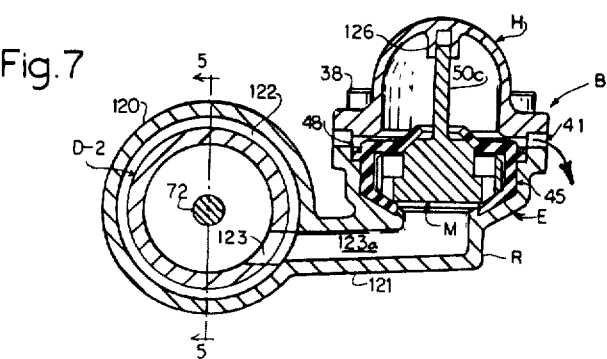

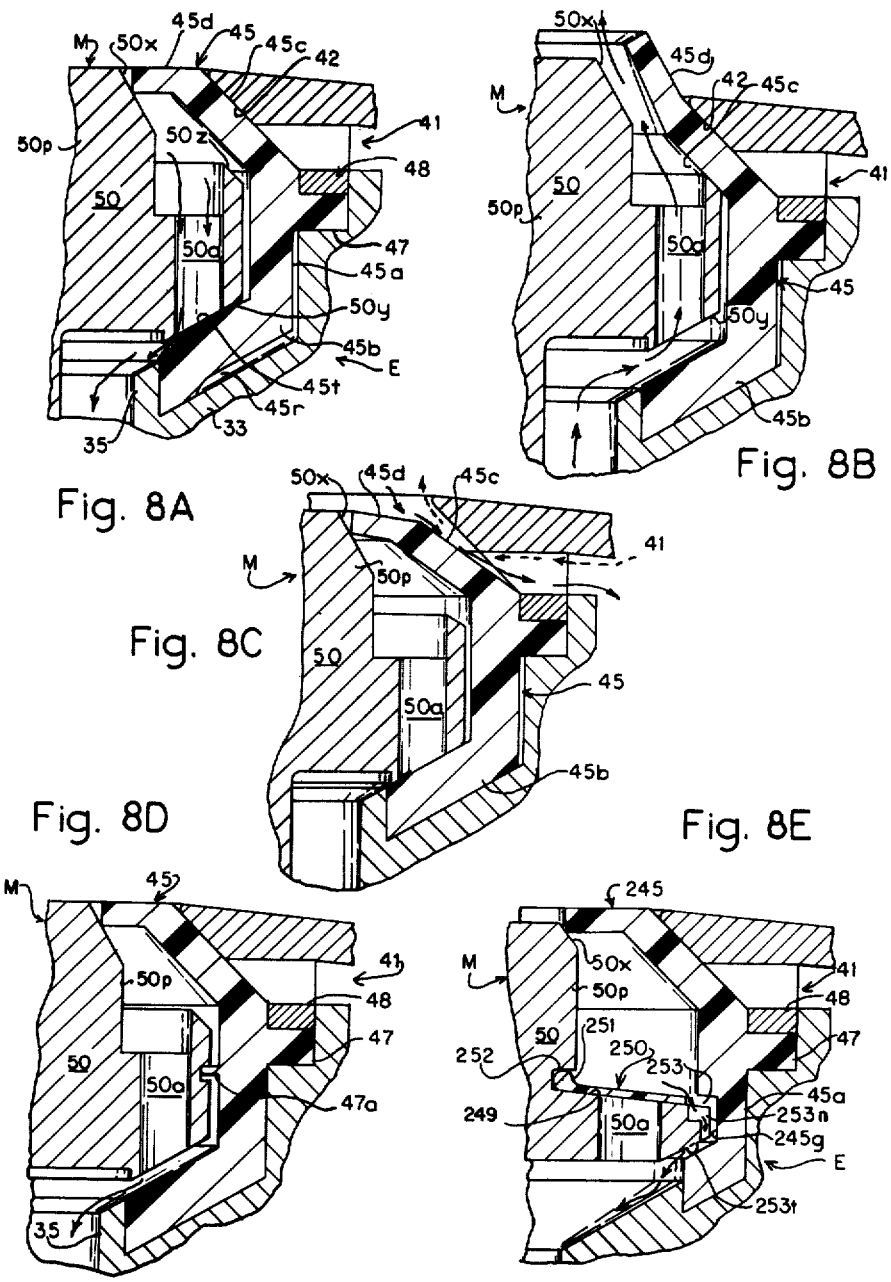

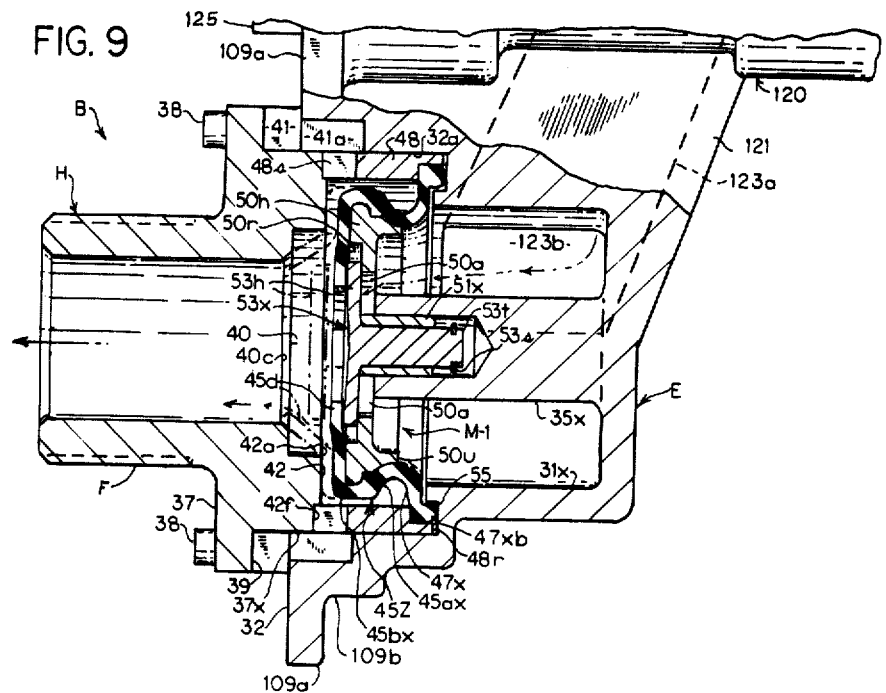

NON-FREEZE WALL HYDRANT

This is a division of application Ser. No. 654,866 filed Feb. 3, 1976, now U.S. Pat. No. 4,221,233. Said Ser. No. 654,866 was, in turn, a continuation-in-part of application Ser. No. 425,503, filed Dec. 17, 1973, now U.S. Pat. No. 3,952,770.

Wall hydrants, that is, valve devices of the type having a water hose connection and operating handle on the outside of a building exterior wall and actual valving structure on the inside of the wall to minimize likelihood of freezing, with consequent inoperability or even damage, preferably incorporate means to ensure drainage of water from the hydrant after water shut off as additional assurance against freezing problems. Difficulties by non-drainage especially can occur when a hose is left attached to the hydrant, including then as well hose freeze up or continued pressure on the hose if the hose nozzle is closed when the hydrant is turned off. Further, because a hose is often left unattended, and is used in many environments representing opportunity for water supply contamination in the event of a vacuum even briefly occurring in the supply line, antisyphoning or vacuum breaking devices are also highly desirable in the hydrant structure itself.

In the prior art as represented by patents and commercial products many hydrant structures or adjuncts to hydrants have appeared attempting to provide a simple hydrant, also to provide hydrant drainage, venting or vacuum breaking or some two of these in combination. However, such prior proposals have various untoward features such as undue complexity, or required close tolerances, hence manufacturing expenses; or unreliability, either due to wear or particular occurrences of damage in service life, or being subject to removal or disabling readily by a user.

Such problems are multiplied where it is attempted to provide a wall hydrant which is self draining and ensures that a hose attached thereto will drain, and which provides for antiback up prevention or vacuum breaking and venting as well so that contaminating back flow to the supply line cannot occur.

By the present invention there is provided a hydrant self-draining upon shut off yet advantageously not involving castings requiring expensive coring for special internal structure; the basic hydrant structure being relatively quite simple, as a non-freezing and drained hydrant. Further without requiring, in the casting or machining operations, undue expense for the results attained, a comparatively simple vacuum breaker structure can be provided as part of the hydrant itself. The structure whereby these advantages are attained is presented in a specific embodiment of the invention hereinafter described in detail.

It is the general object of the present invention to provide an improved wall hydrant which is self-draining, allows ready drainage of a connected hose and incorporates anti-back up expedients.

Another object is to provide a vacuum breaker structure of simple low cost form.

A further object of the invention is to provide a hydrant of the described type which has a relatively simple structure and can be manufactured at comparatively low cost.

Still another object is to provide a simple hydrant structure providing, when shut off, automatic pressure relief to a hose with closed nozzle, and also air venting for hose drainage.

Another object is to provide a hydrant including a simple back flow prevention means.

Another object is to provide a hydrant-wall box combination of cooperative simple structure.

Another object is to provide a hydrant in which elements cooperating for valve operating structure afford a built-in concealed tool for servicing of the primary valving structure.

Other objects and advantages will appear from the following description and the drawings wherein:

FIG. 3 is a longitudinal section of a hydrant modification;

FIG. 4 is a fragmentary axial section showing a hydrant valving region including back flow preventing means;

FIG. 5 is a longitudinal section through a modified hydrant with vacuum breaker and associated wall box;

FIG. 6 is a fragmentary top plan view of the hydrant and vacuum breaker of FIG. 5 but with box in horizontal section;

FIG. 7 is a transverse cross section taken as indicated by line 7—7 in FIGS. 5 and 6;

FIG. 8A represents in section the normal state of a vacuum breaker in the hydrant, and also modification of certain elements thereof from that of FIG. 1;

Figure 2:
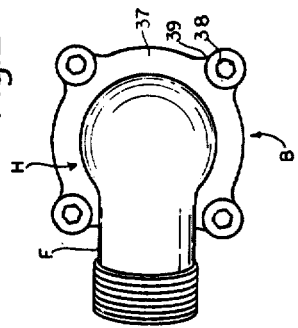
FIG. 2 is a plan view of one part of the hydrant.

FIG. 8B corresponds to FIG. 8A, but shows the condition with hydrant discharge therethrough;

FIG. 8C shows the vacuum breaker under supply line vacuum conditions;

FIGS. 8D and 8E show other modifications;

FIG. 9 is an axial section of a vacuum breaker modification.

GENERAL ARRANGEMENT AND FIG. 1 DETAILS

The drawings show a wall hydrant comprising a building wall penetrating, straight tubular conduit element A; a valving member V moving in piston-like manner axially in and out of a piping connection inlet element C brazed on the inner conduit end; a hollow open-ended cylindrical operating and discharge end element casting D with one end received on and brazed to the conduit outer end, and including a hollow cylindrical outlet formation R to which the end casting interior opens radially as an outlet for the conduit; a closure plug P secured and sealed in the other end of the casting D; an exterior-handle-rotated operating shaft S, for actuating the valving member V on its inner end. The hydrant also has a vacuum breaker and air intake device B including on the outer end of the outlet R, an integral enlargement E which forms a vacuum breaker housing with a cap member H having a laterally turned hose connection formation F as the normal hydrant final discharge point. The radial outlet also may conveniently depart from the end casting at a location say 45° above horizontal and then turn vertical to give a vertical disposition for the cylindrical outlet passage.

The bores or longitudinal passages of the casting D, conduit A, and inlet connection element C are generally aligned, with C having an inlet valving bore 11 of diameter reduced from that of A to accept valving member V axially shifted in and out of the bore and rotationally slideably sealable therein. The shaft outer end 12 projects through and is threaded in a coaxial female threaded aperture of the plug P for operative axial shifting upon rotation by a conventional key or handle, indicated by dotted outline.

The coaxial cylindrical recess 13 in the plug inner end at least at its upper and lower regions has at circumferentially spaced locations, an air intake passage 15 and a drainage aperture 16 opening from the recess bottom, i.e., the recess end wall, to the cap exterior. The fitted plug is secured and sealed to the casting by a flange 14 with radial lugs screw-secured to aligned casting lugs, as lug 18, lug 19, and screw 20; and by an "O" ring 21 received in a circumferential inner edge-groove rabbeted in the open outer end of the casting.

The integral shaft flange 23, rotatably and slideably "O" ring sealed at 24 to the cylindrical recess wall 13a beyond a lead-in chamfer or sloped shoulder 13c, thus shifts with the valving head; and therebetween axial fin-like projections 25 space the shaft coaxially in the conduit flow space from the inlet to the lateral outlet passage. The head and flange seals are so spaced, relative to the spacing of the opposed ends of said recess 13 and inlet bore 11, that the flange 23 escapes recess-sealing disposition to open the tubular conduit to exterior drainage at 16 and air intake therefor at 15, only after inlet closure, and re-seals before inlet opening, upon corresponding axial shaft shifting. The more readily to drain the hydrant, the end casting hollow or passage region 10 occupied by the shaft flange, when the valve is closed, has a diameter somewhat larger than the recess diameter at 13 and is upwardly eccentric from the aligned axes of the plug and conduit to afford radial clearance at least around the sides and top of the O-ring while keeping the bottommost surface areas of the recess, tube and casting hollow at the same level or flush to avoid water retention. Or the passage between the coaxial "counterbores" receiving the plug and conduit end may for example be square with a level flat bottom for the same purpose.

In the valving member V, an integral head enlargement tapers or flares out from the main rod-like length of the shaft stem to a cylindrical head body 26 with a diameter providing an easy sliding guiding fit in inlet bore 11. To the end face of the body there is secured, by screw 27, a conical seal retainer element 28, which also may serve in some degree as a guide for the head entering the bore 11 to carry the seal ring 29 to a valve closing position (or range of positions) beyond bore lead-in chamfer 11c.

The elastomeric seal ring 29 preferably is somewhat T-shaped in cross-section to result in a sleeve-like ring body received on a cylindrical end reduction of the body 26 and a circumferentially girdling external central projection of half-rounded outer periphery reaching beyond the head body circumference to seal on the valving bore, with opposite ends of the sleeve, or the opposed areas of the T section, received in circular grooves respectively provided in the shoulder at the body reduction and by a peripheral flange extending from the retainer face. Preferably the outer surface of the grooves are female conical surfaces, and the ring ends to either side of the girdle portion are axially convex in section to be engaged and, as it were, cammed or compressed in collet-like fashion by the female conical surfaces into sealed relation on the head body reduction.

INTEGRAL VACUUM BREAKER OF FIG. 1

On the hollow cylindrical outlet R, the enlargement E as part of the housing for vacuum breaker B, provides a larger short cylindrical wall 31 with coaxial interior and having a flat end face 32 with an internal peripherally rabbeted edge at the open end of the cylindrical wall; and a conical wall 33 with inside surface convergent toward the outer end of the cylindrical outlet passage 34, the latter serving as an inlet of the vacuum breaker and terminating in a short cylindrical flange 35 extending beyond the junction with the conical wall.

The housing cap member H is secured, with thick annular base flange 37 over said end face and rabbet, by screws 38 (see FIG. 2) through cap lugs 39 into underlying lugs of the enlargement. In this there is a numerous plurality of radial slots for air intake vents 41 intersecting a female conical bevel leading into the internal passage of laterally turned hose connection formation F; there being however, a circumferentially continuous residual bevel portion at 42 as a vent seal seat upward of the air intake vent inner ends. (See also FIGS. 7, 8A, 8B and 8C which, though including variations in details, also more clearly show certain aspects of general structure and behaviour present in common with the vacuum breaker of FIG. 1).

A molded flexible elastomeric hollow element 45 has a cylindrical body portion 45a and has inward inner and outer lips at open-ended conical inner and outer, that is, bottom and top, end portions 45b, 45c; divergencies from strictly conical and cylindrical form in 45b and 45a being later noted.

The bottom conical and cylindrical body portions fit into roughly complementary internal surfaces of the cylindrical and conical wall portions of the casting enlargement, with the cylindrical flange 35 projecting slightly beyond the wall thickness of and into the opening of the bottom end cone; while the conical upper end portion normally fits and seals at 42 to said bevel to close the vents 41, beyond which it extends axially and radially inwardly.

The external circumferential integral flange 47 of rectangular cross-section is received in the rabbet at 32 and thereover a ring 48 to retentively clamp and seal the cylindrical body 45a of, and hence the centrally apertured flexible diaphragm provided by parts 45c-45d in, the elastomeric element to the casting enlargement; and, to stabilize this seal, the body 45a projects into a slight counterbore at the large end of the bevel leading to seat 42.

To provide the vent openings 41, preferably rather than casting or machining in the opposed adjacent edges of the enlargement or of the cap, there is interposed between them the ring 48 as a molded plastic ring element having a top part with the numerous radial slots and, to be received in the enlargement rabbet as a pressure clamping ring to retentively clamp the external circumferentially continuous peripheral flange 47 of the elastic element, the ring having also a small circumferentially continuous bottom portion of square rectangular narrow cross-section.

On the bottom or flange face of the cap, broad shallow grooves relieve most of the area with three or four equi-spaced residual lands amounting to only a small minor portion of a circle presenting contact pads 49 applying clamping pressure on the vent-slotted top of ring 48; the lugs 39, having downward bosses of the same thickness as the pads 49. These formations may all be cast in. The machining is required on the cap only for the narrow female bevel seal seat 42, the slope of which is matched by a beveled slotted top part of ring 48 located inward of these pads, and for the hose attaching threads and screw-apertures of the lugs of the cap. The simple face cut for the pads and bosses suffices.

A shiftable member M, with a head enlargement 50 within the flexible element and a reduced shank 51, is guided by a shank end flange 52 having flow apertures 52a therethrough and slideable in the cylindrical hydrant outlet, i.e., vaccum breaker inlet passage 34. The shiftable member is gravitationally biased to a normal engagement with the hollow element 45 at spacer region 45s as later explained. A plurality of through-apertures 50a, from one beveled head end face to the other, are located radially inward of said region 45s, so that when the head merely drops down, the apertures 50a are not occluded by contact with bottom end 45b.

Around the head projection 50p, a groove 50g intersects the apertures 50a to increase flow area, the top of the groove-bounding upward flange or skirt at 50z being beveled. Within the outer conical end or lip portion 45c, a flexible radial inward lip portion 45d normally seals upon the concentric top end bevel 50x, which bevel also increases flow area past the lip 45d as upwardly flexed under water discharge with member M also displaced upwardly as shown. The peripheral bottom bevel 50y likewise affords increased flow area to apertures 50a under these conditions; while the peripheral bevel 50z, radially located on the head top side aligned below the seat 42, increases seal pressure of 45c on seal bevel 42 under flow conditions to close off the air vents.

Here in seal element 45, the bottom end wall 45b is termed "conical" in loose sense only, for in normal radial cross section (see FIG. 1) wall 45b presents an inner surface having in its outer circumferential region, outward of the centers of apertures 50a and near the body portion 45a, a spacer bead convexity 45s to which the bottom bevel 50y is tangent. Element 45 can be molded of neoprene of about 40 Durometer. With this geometry, after water shutoff, the beveled bottom outer margin of member M rests by gravity on convexity "high" region 45s with through-aperture bottoms open for drainage from the interior of members M and 45.

Upon hydrant shutoff, hydrant vents 15–16 are automatically opened for hydrant drainage and air entry expediting hose drainage. Dimensioning may be such that after closure additional stem rotation is required to advance the flange seal to the drainage point, since there is no compression of a washer against a fixed seat, but rather a sliding seal with a closed position range beyond chamfer 11c; overtightening seal damage cannot occur; and there is no wearing as with one required seating position.

In the vacuum breaker under discharge flow, the outer conical end surface of 45c seals off the air vents 41 under water pressure and forces of the piston member head moved thereagainst. When a vacuum occurs in the supply line, with the hydrant open, member M drops or is drawn from the FIG. 1 discharge position. Not only does lip 45d flex from seat 42 and seal onto bevel 50x to prevent hose water back flow into the hydrant, but also by top end lip portion 45c flexing in and down, the vents 41 are opened for initial vacuum-breaking air intake for the hose; and obviously, hose drainage is facilitated by vent opening.

HYDRANT MODIFICATION FIG. 3

In FIG. 3, there is shown a simple, modified hydrant form, which also affords an automatic hose pressure relief in the event the hydrant is closed while the hose nozzle is shut off, hydrant self-drainage, and hose drainage as well as back flow prevention. Similar or identical reference legends are used for parts like or analogous to those described for the previous figures. The hydrant is shown in closed position.

Here also an inner end fitting or inlet element C, male and/or female end-threaded for a supply piping connection, having an associated valve seat structure cooperating with a shuttle type valve member V-1, is brazed on the tubular body conduit A, the latter at its front end in turn being brazed as in a socket into counterbore 61 of a hollow open-ended discharge or operating end casting D-1 discharging downwardly through a sloping outlet formation R terminating beyond an integral face flange 60 in a threaded hose connection F.

The main bore 62 of casting D-1 delivers hydrant flow to the outlet and hose connection structure R-F through longitudinally slotted bore discharge openings such as that opening at 63 beginning well in from the female-threaded outer casting end 64; bore 62 providing a cylindrical wall coaxial with the inner cylindrical wall of tube conduit A to rotatably slideably receive, as part of operating shaft means S, a piston 65 sealed thereto by an O-ring 66 in a circumferential rim groove of the piston back flange 65a; an O-ring lead-in bevel 62b being provided at the front of 62. The longitudinal continuity of bore 62 between slots such as slots 63 prevents catching of disk 75 in a tool use to be described.

Threaded into D-1 is a draw plug 68, centrally apertured and threaded in turn to receive the male threaded-piston stem 65s projecting therethrough for a hydrant operating key engagement with its squared end 65d. The plug inner end recess 68a guidingly accepts a piston front flange 65f which is somewhat larger in diameter than the bore 62 to serve as a stop to piston advance upon encountering the bevel 62b or a shoulder between the bevel and outer threaded bore 64.

From respective sloped slots 69a, 70a, under the plug shoulder seating region in the casting outer end, one or more circumferentially spaced drainage and air inlet slots 69–70 are cut longitudinally through the threads at the bottom and top regions of 64 in through the bevel 62b to the beginning of the cylindrical part of bore 62. Accordingly when the hydrant is shut off as shown, and thus the O-ring 66 in flange 65a is backed out to bevel 62b, air can enter the hydrant past the plug at 69 and 70. Hence when the hydrant is shut off, free drainage from the hose is possible, and in the event a hose nozzle is closed, water pressure relief automatically ensues at the slots.

In the valve operating shaft structure S at the reduced back end 65c of piston 65, a hex socket terminates in a central small blind bore, coaxially respectively to receive a male hex collar 71 on, and the slotted, square section end 72f of, a valve operating metal rod 72, secured by collar holding set-screw 73; the rod being slideably guided and supported in conduit A by a disk 75, with a plurality of flow apertures therethrough, clamped with flexible elastomer seal disk 76 between a rod-staking-supported washer 78 and nut 79; the circumference of seal disk 76 having also a normally sealing interference fit with the bore of tube A when the hydrant is off.

The valving end or inlet end element C here affords a bore 11 slideably housing the valving shuttle member V-1, as a valve element shiftable between an inlet end constriction 80 serving as a retainer and a valve seat structure comprising a shouldered hex-apertured seat plug 83 threaded into the forward female threaded intermediate counterbore 84 and at its inner end clamping an elastomeric seat washer element 85 against a counterbore shoulder 86.

The body 81 of valve element V-1 is of generally solid cylindrical form with a plurality of at least three equi-spaced guide ribs 81r sliding on the inner bore of C to define therewith longitudinal flow passages past body 81; and its forward end is rounded more readily to seal to the seat seal element 85. Within the ribs 81r the body back end is flat and centrally recessed to receive the stem of a half-round type elastomeric back flow seal 87 with edge embraced by the ribs for cooperation with inlet bevel 80a serving as a back flow preventing valve seat.

Main inlet seat seal or washer 85 is centered by a central end lip 83a surrounding the hex through-opening of the seat plug, and about its central aperture has a triangularly sectioned seat ridge 85b to receive and seal on its inner sloped periphery with the rounded front end of valve member V-1, and sealingly to accommodate thereto. The ridge inner face or slope has in radial section preferably a slight concavity, so shaped relative to the curvature of the rounded end of the valving member, that the thinner portion of the ridge first contacts the rounded end; and the outer face or slope provides area exposed to inlet water pressure in a pressure assisted sealing configuration.

With this valving arrangement, conveniently shaft stem 65s has a left-handed thread, so that when the user by habit turns the key (not shown) counterclockwise, shaft rod 72 in the hydrant (closed as shown) advances to displace the valve member from the main seat to an open position, at the same time advancing 65 to bring O-ring 66 into piston sealing relation in 62 closing slots 69, 70 when water is delivered to the downwardly directed lateral outlet structure R at the front or discharge end.

Upon clockwise rotation, rod 72 backs out and valve V-1, urged by flowing water conditions, follows to seat against 85 shutting off the flow and being there held by water pressure. Just as the valve closes, back flange 65a, hence the O-ring 66, reaches the sloping shoulder 62b, so that the hydrant and hose can drain, or pressure in the hose is automatically relieved if a hose nozzle happens to be closed.

A coaxial blind hole 81h in the front end of the valve member and the hex aperture of seat plug 83 are sized to mate respectively with the slotted or split rod fore end 72f and the hex collar 71, and the valve-member-contacting inner end 72d of the rod 72 has the same square cross section as the operating key-accepting end 65d of the piston-like vent and drainage valving element 65. Thus when the plug 68 and piston 65 are unscrewed out of the front end with rod 72, and set screw 73 is loosened to free the rod, the latter may then be reversed and, with the hydrant key put on its square end 72d, be inserted as a tool to engage and simultaneously remove the hex apertured plug 83 and valve member, the slotted end 72f having a resilient force or interference fit in 81h to ensure retention for this purpose.

Also with this arrangement, washer 76 is deflected away from disk 75 and the wall of tube A when the valve is open and water flowing. But should a supply line low pressure or vacuum develop, immediately upon discharge flow ceasing, flap washer 76 closes to seal across the disk apertures and against the interior of conduit A; and upon beginning of any back flow past this point, because of a debris particle preventing sealing, for example, the shuttle V-1 moves rearwardly and closes the inlet against back flow by seating 87 on bevel 80a; thus providing a double seal in addition to, or alternatively to, the operation of the back flow prevention at 75.

SHUTTLE MODIFICATION—FIG. 4

In FIG. 4, a modification of the inner end valving structure appears in which first, the main inlet seal or seat structure is slightly changed, the seat plug element 143 having a broad shallow groove about its central hex aperture in which a molded washer seal 145 is received, with however its annularly ridged central part 145b again as in FIGS. 3 and 5 overhanging a central lip or axial flange 143a surrounding the plug opening; the outer periphery having a semi-round section bead 145d sealing in O-ring like pressure-assisted fashion against inlet element shoulder 146.

More importantly the inlet opening 150 is more constricted and has a slight bevel at 150a; and on a short coaxial teat or projection 151 of the back end of valve member V-1, a screw 152 successively secures a quite flexible elastomeric disk 153, a rigid metal or plastic disk 154 with a plurality of flow apertures 155 therethrough, and a button type or semi-round elastomeric washer or seal element 156 adapted to cooperate with bevel 150a as a seat to close off the inlet against back flow. Disk 153 has again (as in FIG. 3) a circumferential slight interference sealing fit normally with the bore wall at 11 in C.

With this arrangement washer disk 153 is actually deflected to the position shown only when the valve is open and water flowing through disk 154. Should a supply line vacuum develop, immediately upon line pressure drop and cessation of inlet flow, even before back flow of water begins, flap washer 153 closes; and then the valve member or shuttle moves rearwardly to seat 156 on the inlet and so close it, here also providing a double seal in addition to, or alternatively to, the operation of any vacuum breaker associated with the hydrant.

WALL BOX HYDRANT WITH VACUUM BREAKER, FIGS. 5-7

In FIGS. 5, 6, and 7 appears a modified form of hydrant and vacuum breaker in association with a wall box, and again providing automatic pressure relief of the hose as well as self drainage; and which affords certain advantages especially from the viewpoints of aesthetics, lower manufacturing cost, function and reliability of operation. Similar or identical reference legends are used for parts like or analogous to those described for the previous figures. In FIG. 5, the hydrant is shown at open position.

The wall box W is formed in any appropriate manner from desired materials, as from brass or other sheet metal by blanking, drawing and forming operations to a rather deep rectangular basin to provide an apertured back wall 101 with four continuous lateral walls, as at 102, 103, 104 for top, bottom and sides, continuously outwardly flanged as at 105 to engage the wall face and afford at its bottom a hinging base for door 106; the lateral walls being staked or upset inwardly first at points 108 equi-spaced from the back to support an interior partition 109, and at 110 to form a striker for a door latch.

Here also an inner end casting or inlet element C, its associated valve seat assembly 83–85 cooperating with valve member V-1 in bore 11, piston 65, draw plug 68, connection to tubular conduit A, combination concealed tool and rod part 72 of operating shaft S with guide and support disk 75, are identical in structure, relation to each other and function to the corresponding elements in FIG. 3, except that the back flow preventing seal disk on disk 75 and the coal washer on valve member V-1 are omitted, or as otherwise noted.

The front end of tubular body conduit A is brazed in a socket of a hollow, generally cylindrical operating or discharge end casting D-2 with reduced shouldered back end fitted in and slightly projecting through apertured box back wall 101 and thereto affixed through lateral lugs 113 tapped and secured by bolts 114.

Circumferential external grooves, in the back part of D-2 as a first discharge end member and in a reduced front part thereof just forward of an intervening sloping shoulder 115, receive O-rings 116, 117 to seal to the bore and counterbore of an outlet collar casting 120 as a second discharge end member. The latter includes a hollow lateral extension 121 (see FIG. 6) providing passage 123a which at its inner end communicates with a circumferential groove 122, hence an outlet opening 123, of casting D-2 located between the O-rings, and (see FIG. 7) at its outer end as the inlet to the vacuum breaker, opens upwardly into a discharge outlet enlargement E.

Onto the counterbored outer end 124 of D-2, projecting through a matching opening in partition 109, a nut 125 is threaded to secure the hydrant to the partition and thereby also to secure the collar 120 at proper axial position relative to groove 122 and opening 123 in a rigidly clamped arrangement of the hydrant in the box. Angular orientation is not critical relative to 123 because of the flow space provided by groove 122. However, ears or lugs 119, projecting endwise from the collar, and notched to receive respective lugs 113, further fix the angular orientation of collar 120 on the casting D-2.

Here cap H bolted to the enlargement E forms a vacuum breaker housing, with a vent ring 48, elastic hollow seal member 45 and shiftable valving piston member M therein, both differing somewhat in details but in essential structure and mode of operation being identical with that previously described relative to FIGS. 1–2 and later for 8A–8E.

Here as is immediately observable piston member M is guided by a coaxial rod 50c extending from its top into a blind hole in a downward central boss 126 of the cap; in FIG. 7 the vacuum breaker being shown closed to back flow by suction i.e., with its conical top wall flexed down onto member M, allowing air intake at 41 for hose drainage or, absent the hose, water drainage as indicated by the arrows. The discharge conduit portion F of the cap extends horizontally forwardly through partition 109, to which it is secured likewise by a nut 128 threaded onto the hose-receiving male end threads, and cooperating with cap flange or shoulder 129 to clamp onto the partition.

Here in D-2, the principal bore 130, from which discharge opening 123 departs, is substantially flush with as well as coaxial with the inner cylindrical wall of tube conduit A, to rotatably slideably receive the piston 65 sealed thereto by its O-ring 66.

As in FIG. 3, so also in FIG. 5, the bore in D-2 behind the lateral discharge outlet opening forms with the recessed back face of the plug 68 a valving recess with a circumferential internal shoulder for cooperation with the flange 65a on the stemmed piston 65; the latter as secured to the rod 72 resulting in a composite hydrant operating shaft with a shaft-carried valving flange in a valving arrangement for the hydrant drainage and venting passages. Thus this arrangement is similar to that of FIG. 1, where however, the locations of the large and small diameter parts of the composite recess are reversed from that of FIGS. 3 and 5 because of the opposite axial direction of operating shaft or rod shift in the hydrant closing operation due to the diverse form of the main hydrant inlet valving structure.

The counterbored outer end of casting D-2 is internally threaded, up to a bevel 132, leading into bore 130, to receive the plug 68. Here one or more drainage and air inlet slots 139, 140 are cut longitudinally through the internal bore or external plug threads at the bottom and top regions of the counterbore from its outer end in through the sloping shoulder 132 to the beginning of the main bore 130. Accordingly when the O-ring bearing flange 65a of piston 65 is backed out to the sloping shoulder, drainage from D-2, hence from the conduit A and the vacuum breaker is possible, as well as the automatic pressure relief discussed relative to FIG. 3.

It should be observed that the vacuum breaker associated with the wall box hydrant is readily removed for service by removing nut 125 and preferably nut 128, to enable withdrawal of partition 109 and sliding collar 120 off of hydrant casting D-2, bringing therewith the vacuum breaker out where cap securing bolts 38 may be unscrewed for cap removal giving access to the vacuum breaker interior for work as needed. By disposing an enlargement E with axis (as in FIG. 9) parallel to the hydrant axis, the casting providing member 120 and enlargement E may include an integral escutcheon plate 109a serving as a cap-mounting flange on E while replacing plate 109, especially for a hydrant design useable without box, or in a shallow open-bottomed box for which the integral plate forms the bottom.

The mode of operation of the hydrant, vacuum breaker tool usage, etc., is as described for the corresponding type devices herein previously disclosed.

The cooperative structures of the wall box and discharge and element castings simplify the operating end castings, machining thereof and manner of overall assembly.

VACUUM BREAKER FIGS. 8A–8C

Figure 1:
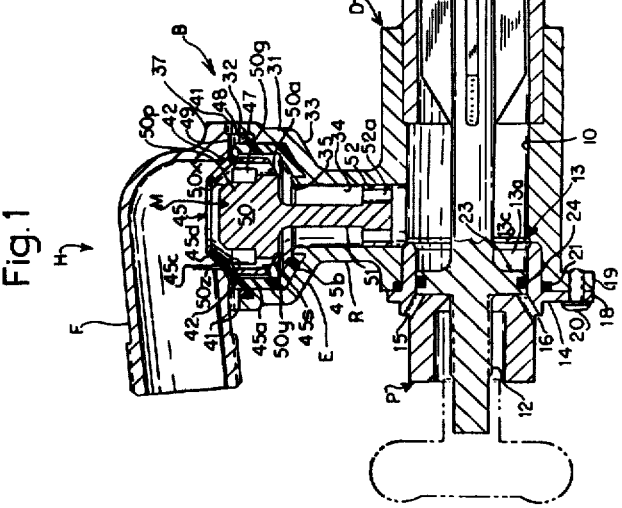
FIG. 1 is a longitudinal axial section through a wall hydrant embodying the present invention.

In FIGS. 8A–8C are shown cooperating forms of element 45, molded of neoprene of about 40 Durometer, and of shiftable member M and also respectively three operative vacuum breaker conditions, as occur also in FIG. 1. Here actually the bottom end wall 45b is termed "conical" in loose sense only, for in normal radial cross section (see FIG. 8A), 45b presents a top (i.e., upper inner surface) convexity 45t and an external lower central bottom surface concavity 45r; with the convexity in its outer circumferential region (as seen in section) near the side of body portion 45a, being tangent to the bottom bevel 50y outward of the centers of apertures 50a when member M is merely resting on the convexity. Hence, for the normal undistorted condition of element 45, between the underlying conical inner surface of the enlargement bottom wall 33 and the bottom 45b there is a free space beginning somewhat outward of the flange 35; and also a circumferential clearance, below the flange 47 about the body 45a; whereas above the flange 47 the ring 48 embraces 45a and also the adjacent periphery of top outer conical surface of 45r.

With this geometry, the outer margin of the beveled bottom of shiftable member M rests on the convexity "high" region 45t with the major parts of the through-aperture bottoms open for drainage as in FIG. 8A.

When a vacuum occurs in the supply line, with the hydrant open, member M drops from the discharge flow position of FIG. 8B, past the condition of FIG. 8A to that of FIG. 8C. In this event, not only does the flexible lip portion 45d contact 50x, but also the element top end lip portion 45c flexes in and down to open the vents 41 for initial vaccum-breaking air intake for the hose and, in sealing down on the top end bevel 50x, to prevent back flow of water from the hose into the hydrant. Also to provide a further seal, as with the drop of the piston onto the bottom wall of hollow member 45, and the vacuum urging on the piston M, the convexity of the bottom wall 45b is flattened toward the enlargement recess bottom to allow sealing contact of the elastomeric element across the bottom ends of the through apertures 50a; the previously described circumferential radial clearance about the body 45a and just above the wall junction in hollow element 45 assuring freedom for this movement.

Thus a double seal is achieved against water back flow from the hose, so that if by chance a foreign particle, e.g., from the supply line, should be trapped between the elastomer and an opposed seat surface at one area of sealing, there is yet a second seal to prevent back flow. Even before such contact, the flexing away from seat 42 may permit air entry through the head for vacuum breaking. When the hydrant is shut off and the member M drops by gravity, obviously, the drainage flow from the hose is facilitated by opening of the vents.

Under discharge water flow the outer conical end seals off the air vents under water pressure and forces of the piston member head moved thereagainst.

VACUUM BREAKER SEAL MODIFICATION—FIGS. 8D-8E

In the above described vacuum breakers, as means to space the bottom ends of the head apertures, in the bobbin-like piston member M, from an occluding or sealing relation with the bottom conical wall of the hollow elastic element 45 when the latter is in a normal condition (unstressed by hydrant discharge flow or supply line vacuum conditions) thereby to allow drainage from element 45, an inward circumferential flexible lip, molded on the interior of the cylindrical body portion at 47a and received loosely in a corresponding circumferential groove in the head of bobbin member M, may as shown in FIG. 8D normally space the latter slightly upwards from the hollow element bottom wall, the inward flexible lip 47a yet permitting the axial shifts of member M as described under hydrant discharge or vacuum conditions.

In the fragmentary vacuum breaker sectional view of FIG. 8E, the hollow elastomeric seal element 245 and the bobbin type shiftable member M are both modified to a form enabling easier molding of the seal element, again in about 40 Durometer rubber, neoprene or other appropriate elastomer; the form of the latter also permitting a simplification of the housing enlargement part E.

Here the conical bottom wall is omitted in seal element 245, allowing elimination from the lower housing component of the seal-centering and -holding axial flange 35 of previously described figures. The secondary seal function served by the bobbin M seating down flat on the conical bottom wall of the seal element to close off the flow apertures 50a is here assumed at least in part by a slightly conical soft rubber or other elastomeric washer 250 acting as a normally closed flap valve to seal the top ends of apertures 50a under supply line vacuum conditions, but deflected upwardly upon hydrant discharge or forward flow conditions. Accordingly the bottom of washer 250 and the underlying top surface 249 of member M are complementarily shaped in their slightly conical form.

At its circular inner margin the flap washer 250, as seen in section, enlarges into a nearly three-quarter circular configuration, affording a rounded bead or rib 251 on the upper side which curves reflexly back into the washer top surface, while the bottom washer surface runs straight into the rounded end. This enlargement, received in a circumferential groove 252 cut into, or in the case of plastic molded in, the base of the head projection of M, provides an O-ring type sealing action at the same time the washer is drawn down across apertures 50a onto the underlying bobbin top surface. Groove 252 is "straight walled" as seen in section, it being understood that the lower side wall is actually a continuation of the bobbin conical top surface on which the flap thus seats.

The member 245 again has the external circumferential flange 47 for securement in a housing rabbet by the clamped vent ring 48; and the bottom of its cylindrical body wall portion 45a simply terminates in a beveled end engaged in a corresponding circumferential groove in the housing bottom wall.

However, in a circumferential groove 245g in the inner side of seal element wall portion 45a there is engaged an outward circumferential narrow flange 253 of member M which limits up and down shift of member M.

The flange 253 has a plurality of spaced edge notches 253n therethrough and on its sloped bottom spaced small bosses 253t engageable with the sloped lower wall of groove 245g which allow drainage from the space above washer 250. Upon vacuum development at the vacuum breaker inlet, the downward force on member M causes the bosses to depress locally into the elastomer therebeneath allowing sealing of the drainage passages. Similar action is obtainable using, at arcuately spaced points on the sloped bottom wall of groove 245g, bosses molded in the elastomer, which bosses flatten under vacuum condition developed force applied through the member M. Similarly in FIG. 1 small spaced bosses may be used in place of the rib 45s.

VACUUM BREAKER—FIG. 9 MODIFICATION

FIG. 9 shows another modified vacuum breaker device B applied to a hydrant similar to that of FIG. 5, though again it is useful not only for FIG. 5 or 1, but also as a separate plumbing fitting with inlet and outlet connection formations appropriate to the intended type of use environment. Here again a hollow housing providing through flow spaces from inlet to outlet of the device is constituted by a main member or body E with a square-flanged hollow cap member H which provides the water outlet of the device; and with E being a hydrant outlet enlargement of hollow cylindrical form at 31x having its axis parallel to that of the hydrant, an escutcheon plate 109a may be cast integrally at the front of E and of the hydrant discharge end element 120.

The body E, through successive external diameter increments having what is in effect a stepped flange 109b about its open flat-faced front end 32, is there counterbored at 32a to accommodate a somewhat bellows-like shiftable flexible hollow seal member 45Z surrounded with clearance by a crown-like cylindrical vent ring 48. A coaxial groove 55 as the counterbore bottom receives a rounded annular bead 47xb on the inner face of an outward circumferential end flange 47x of the seal member, the beaded margin of which flange also is received in an internal rabbet 48r of the groove-received end of ring 48. Ring 48 is clamped in the counterbore by cap H in turn secured by screws 38, passing through flat-bottomed cap lugs 39 and threaded into the body E. To provide vent passages, end-opening recesses 41a into the body flange, laterally intersecting the counterbore to the depth of the equi-spaced ring top notches 48s, put the housing interior in communication with vent openings 41 under the cap flange 37.

Here in effect the shiftable seal piston member is composite, being comprised of a primary or main shiftable round-headed piston member M-1 with hollow cylindrical stem 51x slideably received in a centrally bored or tubular end portion of a coaxial body post 35x, and a secondary headed piston member 53x with solid stem 53t slideable in the hollow stem and retained by stop ring 53s. Post 35x is surrounded by cylindrical flow space, the inlet 123b to which represents the discharge point of the integral outlet or passage 123a in formation 121 sloping up from the hydrant discharge end to the housing side, rather than to a central endwise inlet location which would be usually preferable in an independent fitting.

The main head 50h has an internally cylindrical skirt 50u coaxial to and well spaced from the stem support post to afford ample flow space to a cloverleaf pattern of several stem-adjacent through-flow-apertures 50a, which are normally overlapped by and preferably sealed by the underside of head 53h. The latter preferably is thicker than the depth of a shallow flat circular top recess 50r in which the flat bottomed secondary member head 53h seats, with notable circumferential clearance to the residual annular land of head 50h about the recess.

Hollow seal member 45Z, in local longitudinal section, has something of an irregular S-section comprised of two loops arising from an outward and an inward circumferentially continuous corrugation of the seal body. (See FIG. 9, bottom side for the non-discharging condition and position represented in solid lines; the dashed lines indicating a heavy through flow condition). The first loop is an inner semi-circular loop 45ax with somewhat less than its head-adjacent half fitting the large-radiused arcuate concave surface provided by a circumferential external grooving of the skirt 50u, and its other half is extended radially outwardly to form the flange 47x; thus resulting in the inward circumferential corrugation in the seal member at the inner end of the latter. The second loop 45bx of the section has a somewhat squared shape, providing an internal circumferential groove, receiving the projecting thinned periphery of main head 50h. The second loop includes an as-molded flat radial circumferential inward lip portion 45d extending inwardly across main head 50h to overlap the head 53h, thereby spanning an annular free space of recess 50r unoccupied by head 53h.

To the left of the arcuate surface of head skirt 50u, a right angle section groove, in effect a circumferential head bottom rabbet, defines the thin section edge-rounded outer margin of the head 50h, and also receives a corresponding angular internal thickening bead at the juncture of the loops. This reinforces the juncture region of the seal body to confine a bellows-like axial extension and contraction movement and deformation to the seal inner corrugation and its flange 47x.

The outer loop region or outward corrugation of 45Z, forming in effect a hollow seal head for receiving head 50h, has a close clearance with surrounding ring 48, to prevent seal blow-off from the head and extrusion into ring slots 48s under extreme operating events. The lip 45d clings flat across the land or outer face of the main head 50h up to its recess; and, with the secondary member head 53h projecting from that recess and thus displacing the lip from its as-molded flat radial disposition, develops force keeping it pressed resiliently sealing onto the edge of the head 53h and thereby biasing the latter towards and against its recess seat. The head 53h preferably has a concavity or relief starting at the head margin to increase a thin-edge sealing effect with lip 45d, precluding water flow out the lipped end of the seal member until a design-contemplated water pressure is effectively applied to the lip inner face, even though head 53h is unseated.

Inward of vent openings 41 and of bottom portions of lugs 39 serving as spacer pads bearing on the housing body flange 109b a short, flat-ended, externally cylindrical, annular cap extension 37x is received in the body or enlargement counterbore and is itself counterbored at 40, first to provide an operating clearance for lip 45d when the latter is outwardly deflected and secondly, opposite the seal-covered margin of head 50h, to define at the end of 37x a flat shoulder 42 and a sharp circular 90° edge 42a which constitute a seal seat for lip 45d under flow conditions to be explained.

The seat flat part or shoulder 42, in part overhanging the margin of head 50h and thus terminating at the counterbore 40 as a broad mouth into the cap water outlet passage, provides a sealing contact area engageable by the land-supported region of primary seal lip 45d, to close off the vents during water discharging flow.

The lip 45d in deflecting over the sharp edge provides also a nearly line contact for additional seal effect, and under extreme flow condition, can reach and conform to a bevel 40c between the counterbore bottom and the cap outlet passage, as a further seal area.

The extension at an annular flat end clamping surface 42f also engages upon and clamps the ring 48, and through the latter clamps the bead bearing margin of flange 47x. The annular margin bead 47xb, being captured between the opposed walls of the end rabbet and groove 55, provides an O-ring type action to seal the seal member to housing.

It is preferable that, external to its stem, the annular bottom area of head 53h be greater than the lip bottom area which is exposed to water pressure upon unseating of the latter head, i.e., the annular lip area external to head 53h, here for the described clinging disposition of 45d, the annular area of the recess not occupied by head 53h.

On water discharge flow, (see dashed line positions on FIG. 9) as inlet water pressure is applied, member M-1 moves outwardly pressing the flat of lip 45d against the sealing shoulder, closing off the vents; and thereafter the secondary member 53x unseats moving out against the increasing bias of lip 45d until stopped by ring 53s engaging the stem 51x; and finally lip 45d flexes out from the unseated head 53h stretching wider the central opening defined by the lip, for free flow of water from apertures 50a. With water flow the pressure drop past head 53h represents a pressure differential applied to head 53h, hence through the retainer ring 53s to M-1 and head 50h, to press the seal more firmly against the seat.

Upon water shut off, release of water pressure on the seal member and on the composite head allows the assembly of seal and head elements to return to normal positions with secondary member 53x closing apertures 50a, and the strain in 45d at the large loop pulling the shiftable assembly away from the shoulder 42. Air can then enter the vents for hose drainage. The passages on all sides at vents 41 allow breaker drainage.

In the event a vacuum occurs in the supply line, while the hydrant is open, the deflecting force against the lip 45d having disappeared, the lip closes down on the head 53h and the latter on the flow apertures 50a, in effect double-sealing them, thus preventing contaminating back flow; and the heads, that is, the composite shiftable member, are drawn inward, so that the air can enter vents 41 to drain the hose, thus breaking the vacuum.

Ring 48, members M-1, and 53x usefully are molded of a water resistant stable synthetic plastic material, while primary seal member 45Z is molded or formed of a rather soft elastomer e.g., about 35 Durometer neoprene or a similarly very soft rubber.

The material distribution, i.e., longitudinal section of seal member 45Z, thus is to allow easy extension and contraction at corrugation 45ax under low applied pressure, while the interference fit of head 53h under the lip 45d and the sizing of the members and the relative stiffness at the head-embracing "loop" region of the seal ensure that no water can flow past the head and seal assembly until the vent-closing sealing is achieved.

For example, in conventional domestic water supply line applications the section of member 45Z is so chosen that at ½ psi (0.035 kg/cm²) the entire assembly of members M-1, 53x and the outer part of 45Z shifts out to press lip 45d on the seating shoulder 42; while 53x is moving out after unseating and opening apertures 50a, the seal of lip 45d on the head 53h does not release i.e., lip 45d does not lift from 53h, until say 3½ to 6 psi (0.25 to 0.42 kg/cm²) is applied.

Preferably, better to develop seal-assist forces, the total flow area through head apertures 50a and the annular radial flow area represented at the outer boundary of apertures 50a by the spacing of the head 53h unseated fully from the bottom of the recess (=2πrd, where r = radius of boundary, d = unseated distance) are each less than each of the areas of the inlet at 123h and of the central aperture of the seal lip 45d.

What is claimed:

1. In a wall hydrant including a building wall penetrating straight tubular conduit element, a water pipe inlet connection element joined on one end of the conduit element as a hydrant inner end, and a hollow open-ended operating and discharge end element with its inner end joined on the other end of the conduit element, as a hydrant outer end to be accessible at the outside of the building wall, the discharge end element having a lateral outlet, said elements constituting a hydrant body, and a water valving member axially shiftable in and out of an inlet passage closing position at a valving bore of said inlet element for opening and closing the hydrant, the structure comprising:

operating shaft means extending through and axially shiftably supported in said body to control axial shift of said valving member in and out of said closing position, a closure element secured to and sealed in the other, outer, end of said discharge element as a plug and providing an end wall with a threaded central aperture coaxially aligned with the conduit element and said valving bore and having said shaft means threaded therethrough to be rotationally operated to effect axial shifting;

said valving bore interiorly terminates at and opens toward said conduit element through a valving seat structure including an annular male-threaded element screwed into a female thread at the end of the valving bore, said annular element has a torque tool accepting formation axially accessible from its outer end;

said operating shaft means comprises a valve operating rod extending coaxially through said conduit element, and an element having on one end a steam threaded through the end wall threaded aperture and at its other end a coaxial socket, said rod as a separable element having one rod end setscrew secured in said socket and the other rod end supported coaxially of said conduit for operation of said valving member;

the set screw-secured rod end carrying a torque tool element adapted to rotationally drivingly engage with said accepting formation, whereby upon extraction of said closure with said operating shaft means from the hydrant body, and release of said rod from its set screw securement and end-for-end reversal, the rod provides a tool for removal of said annular element of the seat structure.

2. In a wall hydrant including a building wall penetrating straight tubular conduit element, a water pipe inlet connection element joined on one end of the conduit element as a hydrant inner end, and a hollow open-ended operating and discharge end element with its inner end joined on the other end of the conduit element, as a hydrant outer end to be accessible at the outside of the building wall, the discharge end element having a lateral outlet, said elements constituting a hydrant body, and a water valving member axially shiftable in and out of an inlet passage closing position at a valving bore of said inlet element for opening and closing the hydrant, the structure comprising:

operating shaft means extending through and axially shiftably supported in said body to control axial shift of said valving member in and out of said closing position, a closure element secured to and sealed in the other, outer, end of said discharge element as a plug and providing an end wall with a threaded central aperture coaxially aligned with the conduit element and said valving bore and having said shaft means threaded therethrough to be rotationally operated to effect axial shifting;

the said valving bore interiorly terminates at and opens toward said conduit element through a shoulder within said inlet element surrounding the flow path to the conduit element;

said inlet element has a female threaded portion adjacent said shoulder, a washer-like seal element having outer periphery sealingly engaging the last said shoulder affords an apertured valving seat facing said valving bore;

a male-threaded clamping ring is screwed into the inlet female threaded portion to bring its inner end as a seal clamping face to bear on and removably clamp said seal element against the last said shoulder;

said valving member comprises a shuttle-like element axially slidable in the valving bore to and from a valve closing position with one end sealingly engaging said valving seat, said shuttle-like element with a surrounding cylindrical surface of the valving bore defining flow space in the inlet element from a water pipe connection to the apertured seat; and said operating shaft means includes a push-rod extending coaxially through said conduit element and engageable with said one end of the shuttle element to displace it against inlet water pressure from said seat, and to hold it displaced in an open position against water flow pressure forces urging it back to closed position;

said clamping ring has a torque tool accepting formation axially accessible from its outer end;

said operating shaft means comprises an element having on one end a stem portion threaded through the end wall threaded aperture and at its other end a coaxial socket, and said push rod as a separable element having one rod end set-screw-secured in said socket and the other rod end coaxially supported in said conduit in an alignment for operating engagement with said valving member;

the set-screw-secured rod end carrying a torque tool element adapted to rotationally drivingly engage with said accepting formation;

whereby upon extraction of said closure with said operating shaft means from the hydrant body, and release of said push rod from its set screw securement and end-for-end reversal, the push rod provides a tool for removal of said clamping ring and seat.

3. A hydrant as described in claim 2, wherein said torque tool element is a coaxial enlargement on the push rod non-circular in external shape, and normally received in a said socket of complementary cross-sectional shape;

said tool accepting formation comprises a central flow aperture of said ring and of a non-circular shape to be driven rotationally by said tool element engaged therein;

said rod has a reduced end projection beyond said enlargement and accepted in a central blind bore in the socket bottom; and the rod engaged end of said valving member has a coaxial blind hole adapted to receive said reduced end projection with a light interference fit;

whereby then said push rod is used as a tool and said tool element is inserted into said ring formation, the reduced end projection engages in the valving member, thereby to remove the valving member, seat and ring as the latter is unscrewed and removed from the hydrant body.

4. A hydrant as described in claim 3, wherein said inlet connection element has a radial constriction at the inlet end of said valving bore for limiting the displacement of said valving member away from said seat thereby to provide a valving member supporting abutment upon insertion of the end projection of the rod used as a tool.

5. A hydrant as described in claim 2, wherein the normally valving member engaging end portion of said push rod is as by male threading, adapted to be engaged by a length-extending ancillary tool when used as a valve seat servicing tool.

6. A hydrant as described in claim 2, wherein the seat clamping end of said ring has a concentric face groove wherein is fitted a said seal element with internal and external peripheries embraced for a part of the seal element thickness by internal and external wall portions of the groove, thereby to provide frictional retention of the seal element in the ring for insertion and removal operations.

7. A hydrant as described in claim 2, wherein said shaft means carries a guide support disk element rotationally and axially slideably engaging an interior cylindrical surface of said tubular conduit element, and having flow apertures therethrough, and a flexible elastomeric seal disk on the downstream side of the disk element normally having a peripheral light interference with the conduit element and covering said flow apertures whereby back flow is prevented and by flexing of the seal disk away from the disk element forward hydrant discharge flow permitted.

8. In a wall hydrant including a building wall penetrating straight tubular conduit element, a water pipe inlet connection element joined on one end of the conduit element as a hydrant inner end, and a hollow open-ended operating and discharge end element with its inner end joined on the other end of the conduit element, as a hydrant outer end to be accessible at the outside of the building wall, the discharge end element having a lateral outlet, said elements constituting a hydrant body, and a water valving member axially shiftable in and out of an inlet passage closing position at a valving bore of said inlet element for opening and closing the hydrant, the structure comprising:

operating shaft means extending through and axially shiftably supported in said body to control axial shift of said valving member in and out of said closing position, a closure element secured to and sealed in the other, outer, end of said discharge element as a plug and providing an end wall with a threaded central aperture coaxially aligned with the conduit element and said valving bore and having said shaft means threaded therethrough to be rotationally operated to effect axial shifting;

the said valving bore opens inwardly toward said conduit element through a shouldered formation of said inlet element surrounding the flow path to the conduit element, said shoulder formation being provided with an apertured valving seat facing said valving bore;

said valving member comprises a shuttle-like element axially slideable in the valving bore to and from a valve closing position with one end sealingly engaging said valving seat, said shuttle-like element with a surrounding cylindrical surface of the valving bore defining flow space in the inlet element from the water pipe connection to the apertured seat;

said operating shaft means includes a push-rod extending coaxially through said conduit element and engageable with said one end of the shuttle element to displace it axially from said seat, and to hold it displaced in an open position against forces urging it back to closed position;

said inlet connection element has a radial constriction at the inlet end of said valving bore having a central inlet aperture; and the other end of said valving member bears a seal element engageable with the said constriction as a seat for closing the central inlet aperture by backward shift of the valving member upon a vacuum condition arising in connected supply piping.

9. A hydrant as described in claim 8, wherein the last said seal element is secured on the end of a coaxial reduced extension of the valving member; and said extension supports an apertured rigid disk and, against a face of the disk remote from the last said seal element, a normally flat elastomeric seal disk having an external peripheral slight interference sealing fit with the surface of said valving bore; whereby double seals for back flow preventing are provided.

10. In a wall hydrant including a building wall penetrating straight tubular conduit element, a water pipe inlet connection element joined on one end of the conduit element as a hydrant inner end, and a hollow open-ended operating and discharge end element with its inner end joined on the other end of the conduit element, as a hydrant outer end to be accessible at the outside of the building wall, the discharge end element having a lateral outlet, said elements constituting a hydrant body, and a water valving member axially shiftable in and out of an inlet passage closing position at a valving bore of said inlet element for opening and closing the hydrant, the structure comprising:

operating shaft means extending through and axially shiftably supported in said body to control axial shift of said valving member in and out of said closing position, a closure element secured to and sealed in the other, outer, end of said discharge element as a plug and providing an end wall with a threaded central aperture coaxially aligned with the conduit element and said valving bore and having said shaft means threaded therethrough to be rotationally operated to effect axial shifting;

said shaft means carries a guide support disk element rotationally and axially slideably engaging an interior cylindrical surface of said tubular conduit element, and having flow apertures therethrough, and a flexible elastomeric seal disk on the downstream side of the disk element normally having a peripheral light interference with the conduit element and covering said flow apertures whereby back flow is prevented and by flexing of the seal disk away from the disk element forward hydrant discharge flow permitted.

* * * * *